US009338661B2

(12) United States Patent
Ling

(10) Patent No.: US 9,338,661 B2
(45) Date of Patent: May 10, 2016

(54) SPATIAL ROUTING AMONG MICROWAVE BACKHAUL TRANSCEIVERS

(71) Applicant: MaxLinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 84 days.

(21) Appl. No.: 14/248,992

(22) Filed: Apr. 9, 2014

(65) Prior Publication Data

US 2014/0370936 A1   Dec. 18, 2014

Related U.S. Application Data

(60) Provisional application No. 61/809,935, filed on Apr. 9, 2013, provisional application No. 61/881,016, filed on Sep. 23, 2013, provisional application No. 61/884,765, filed on Sep. 30, 2013.

(51) Int. Cl.
| | |
|---|---|
| *H04B 1/40* | (2015.01) |
| *H04W 16/28* | (2009.01) |
| *H01Q 3/40* | (2006.01) |
| *H04W 88/08* | (2009.01) |
| *H01Q 25/00* | (2006.01) |

(52) U.S. Cl.
CPC .............. *H04W 16/28* (2013.01); *H01Q 3/40* (2013.01); *H01Q 25/007* (2013.01); *H04B 1/40* (2013.01); *H04W 88/08* (2013.01)

(58) Field of Classification Search
CPC .............. H04B 1/40; H04B 1/44; H04B 1/50; H04B 1/52; H04W 88/08; H01Q 3/40; H01Q 25/007

USPC .............. 455/450, 504, 509, 62, 63.1, 57.11, 455/550.1, 562.1; 370/252, 329, 341
See application file for complete search history.

(56) References Cited

U.S. PATENT DOCUMENTS

| | | | | |
|---|---|---|---|---|
| 8,989,762 | B1 * | 3/2015 | Negus | H04W 24/02 455/450 |
| 2003/0032424 | A1 | 2/2003 | Judd | |
| 2005/0136980 | A1 | 6/2005 | Kim et al. | |
| 2007/0147485 | A1 | 6/2007 | Sakamoto | |
| 2008/0233879 | A1 | 9/2008 | Sasaki | |
| 2008/0274732 | A1 | 11/2008 | Boutigny | |
| 2009/0023462 | A1 | 1/2009 | Dent | |
| 2009/0207945 | A1 | 8/2009 | Sasaki | |
| 2010/0240327 | A1 | 9/2010 | Lambrecht | |
| 2012/0155887 | A1 | 6/2012 | Youn | |
| 2012/0207048 | A1 * | 8/2012 | Kim | H04W 72/082 370/252 |
| 2013/0089042 | A1 | 4/2013 | Negus | |

(Continued)

*Primary Examiner* — Thanh Le
(74) *Attorney, Agent, or Firm* — McAndrews, Held & Malloy, Ltd.

(57) ABSTRACT

A first microwave backhaul transceiver may comprise a plurality of antenna elements. The transceiver may determine atmospheric conditions between it and one or more potential link partners, and adjust a radiation pattern of the plurality of antenna elements based on the determined atmospheric conditions. A first radiation pattern of the plurality of antenna elements may correspond to a first microwave backhaul link between the first microwave transceiver and a second microwave backhaul transceiver. A second radiation pattern of the plurality of antenna elements may correspond to a second microwave backhaul link between the first microwave transceiver and a third microwave backhaul transceiver. The transceiver may adjust the radiation pattern based on characteristics of data to be transmitted, and based on a routing table it maintains.

20 Claims, 13 Drawing Sheets

(56) References Cited

U.S. PATENT DOCUMENTS

2013/0229309 A1 9/2013 Thomas
2014/0031072 A1* 1/2014 Koorapaty ............ H04L 5/0023
                                                            455/504
2015/0188584 A1 7/2015 Laurent-Michel
2015/0215854 A1 7/2015 Ling
2015/0230105 A1* 8/2015 Negus .................. H04B 7/0408
                                                            370/329

* cited by examiner

SPATIAL ROUTING AMONG MICROWAVE BACKHAUL TRANSCEIVERS

PRIORITY CLAIM

This application claims priority to and the benefit of the following application(s), each of which is hereby incorporated herein by reference:

U.S. provisional patent application 61/809,935 titled "Microwave Backhaul" filed on Apr. 9, 2013;

U.S. provisional patent application 61/881,016 titled "Microwave Backhaul Methods and Systems" filed on Sep. 23, 2013; and U.S. provisional patent application 61/884,765 titled "Microwave Backhaul Methods and Systems" filed on Sep. 23, 2013.

INCORPORATION BY REFERENCE

The entirety of each of the following applications is hereby incorporated herein by reference:

U.S. patent application Ser. No. 13/933,865 titled "Method and System For Improved Cross Polarization Rejection And Tolerating Coupling Between Satellite Signals" filed on Jul. 2, 2013.

BACKGROUND

Limitations and disadvantages of conventional approaches to microwave backhaul will become apparent to one of skill in the art, through comparison of such approaches with some aspects of the present method and system set forth in the remainder of this disclosure with reference to the drawings.

BRIEF SUMMARY

Methods and systems are provided for spatial routing among microwave backhaul transceivers, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting. As used herein, "microwave" frequencies range from approximately 300 MHz to 300 GHz and "millimeter wave" frequencies range from approximately 30 GHz to 300 GHz. Thus, the "microwave" band includes the "millimeter wave" band.

Figure 1:
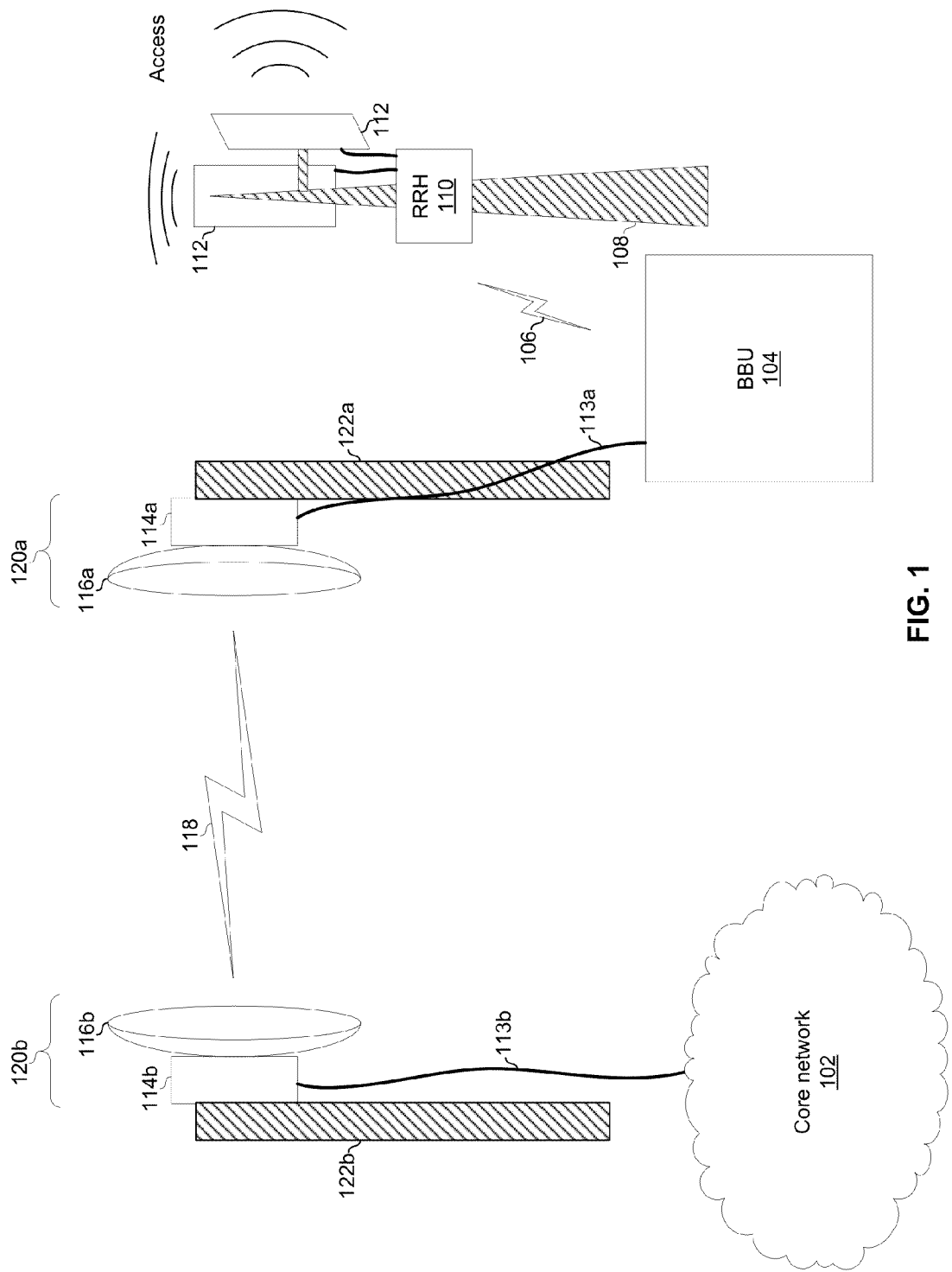
FIG. 1 depicts an example microwave backhaul link between a first microwave backhaul transceiver and a second microwave backhaul transceiver.

FIG. 1 depicts an example microwave backhaul link between a first microwave backhaul transceiver and a second microwave backhaul transceiver. Shown are a tower 108 to which access network antennas 112 and remote radio head (RRH) 110 are attached, a baseband unit 104, a tower 122a to which microwave backhaul transceiver 120a (comprising subassembly 114a and reflector 116a) is attached, and a tower 122b to which microwave backhaul transceiver 120b (comprising subassembly 114b and reflector 116b) is attached. At any particular time, there may be one or more active (i.e., carrying traffic or synchronized and ready to carry traffic after a link setup time that is below a determined threshold) links 106 (shown as wireless, but may be wired or optical) between the RRH 110 and the BBU 104. At any particular time, there may be one or more active backhaul links 118 between the pair of backhaul transceivers 120a and 120b and/or between one of the transceivers 120a and another one or more backhaul transceivers not shown.

The antennas 112 are configured for radiating and capturing signals of an access network (e.g., 3G, 4G LTE, etc. signals to/from mobile handsets). Although the example pair of microwave transceivers 120a and 120b are used for backhauling cellular traffic, this is just one example type of traffic which may be backhauled by microwave transceivers, such as 120a and 120b, that implement aspects of this disclosure.

For an uplink from a mobile handset to the core network 102, the antennas 112 receive signals from the handset and convey them to the RRH 110. The RRH 110 processes (e.g., amplifies, downconverts, digitizes, filters, and/or the like) the signals received from the antennas 112 and transmits the resulting signals (e.g., downconverted I/Q signals) to the baseband unit (BBU) 104 via link(s) 106. The BBU 104 processes, as necessary, (e.g., demodulates, packetizes, modulates, and/or the like) the signals received via link(s) 106 for conveyance to the microwave backhaul transceiver 120a via link 113a (shown as wired or optical, but may be wireless). The microwave backhaul transceiver 120a processes, as necessary (e.g., upconverts, filters, beamforms, and/or the like), the signals from BBU 104 for transmission via the subassembly 114a and reflector 116a over microwave backhaul link(s) 118. The microwave transceiver 120b receives the microwave signals over microwave backhaul link(s) 118 via the subassembly 114b and reflector 116b, processes the signals as necessary (e.g., downconverts, filters, beamforms, and/or the like) for conveyance to the cellular service provider core network 102 via link 113b.

For a downlink from the core network 102 to the mobile handset, data from the core network 102 is conveyed to microwave backhaul transceiver 120b via link 113b. The transceiver 120b processes, as necessary (e.g., upconverts, filters, beamforms, and/or the like), the signals from the core network 102 for transmission via the subassembly 114b and reflector 116b over link(s) 118. Microwave transceiver 120a receives the microwave signals over the microwave backhaul link(s) 118 via the subassembly 114a and reflector 116a, and processes the signals as necessary (e.g., downconverts, filters, beamforms, and/or the like) for conveyance to the BBU 104 via link 113a. The BBU 104 processes the signal from transceiver 120a as necessary (e.g., demodulates, packetizes, modulates, and/or the like) for conveyance to RRH 110 via link(s) 106. The RRH 110 processes, as necessary (e.g., upconverts, filters, amplifies, and/or the like), signals received via link 106 for transmission via an antenna 112.

Figure 2:
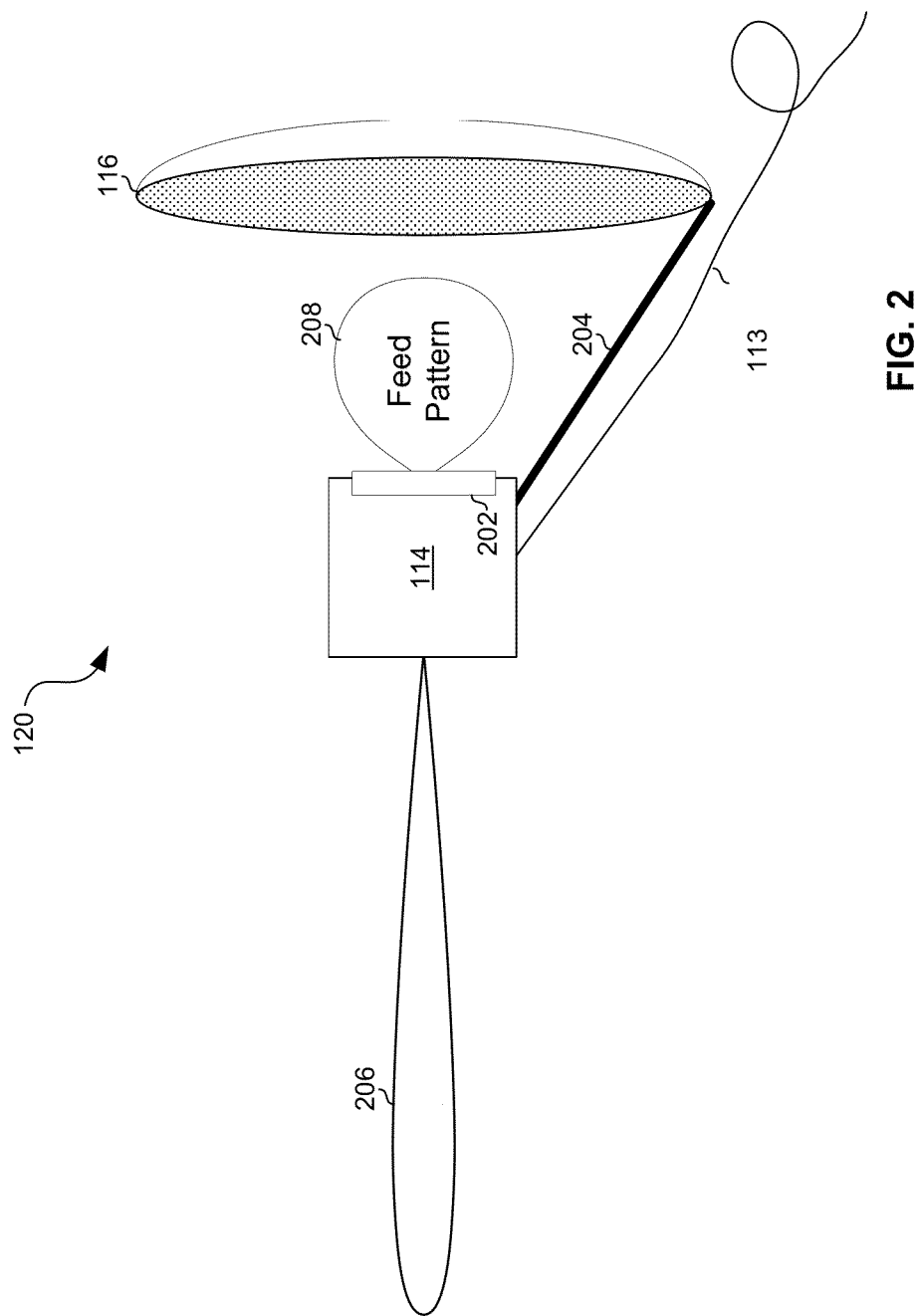
FIG. 2 shows an example implementation of a steerable microwave backhaul transceiver.

FIG. 2 shows an example implementation of a steerable microwave backhaul transceiver. The depicted transceiver 120 represents each of the transceivers 120a and 120b described above with reference to FIG. 1. The example transceiver 120 comprises the subassembly 114 mounted to a support structure 204 (which may, in turn, mount the assembly to the mast/tower 122, building, or other structure, not shown in FIG. 2), and a link 113 which represents each of the links 113a and 113b. The subassembly 202 comprises an antenna array 202 which in turn comprises a plurality of antenna elements. The subassembly 202 may be mounted such that the antenna elements are positioned at or near a focal plane of the reflector 116. The subassembly may comprise, for example, one or more semiconductor dies ("chips") arranged on one or more printed circuit boards. The antenna elements may be, for example, horns and/or microstrip patches. In the example implementation depicted, the antenna elements capture signals reflected by reflector 116 for reception and bounce signals off the reflector 116 for transmission. The radiation pattern 208 of the antenna array 202 corresponds to a radiation pattern 206 after reflection off the reflector 116. Although the radiation patterns may comprise multiple lobes, only a main lobe is shown for simplicity of illustration. In another implementation, the antenna elements may directly receive backhaul signals, or receive them through a lens, for example.

Figure 3:
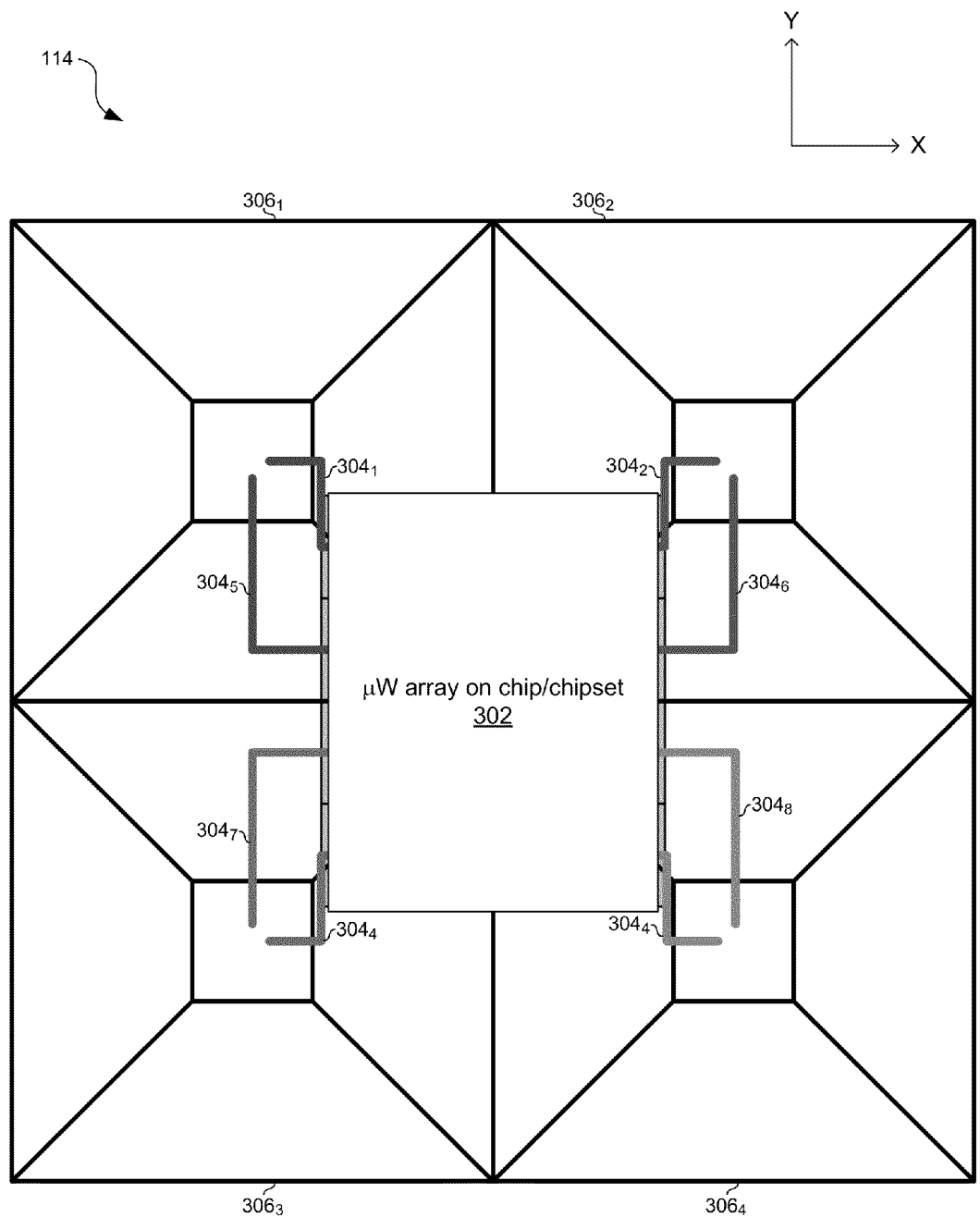
FIG. 3 shows an example implementation of the subassembly of FIG. 2.

FIG. 3 shows an example implementation of the subassembly of FIG. 2. The example subassembly 114 comprises four feed horns $306_1$-$306_4$, and circuitry (e.g., a chip or chipset) 302. The circuitry 302 drives signals to the horns $306_1$-$306_4$ via one or more of feed lines $304_1$-$304_8$ for transmission, and receives signals from the horns $306_1$-$306_4$ via feed lines $304_1$-$304_8$ for reception. The circuitry 302 is operable to control the phases and/or amplitudes of signals output to the feed lines $304_1$-$304_8$ so as to achieve desired transmit radiation patterns. Similarly, the circuitry 302 is operable to control the phases and/or amplitudes of signals received from the feed lines $304_1$-$304_8$ so as to achieve desired receive radiation patterns.

The feed lines $304_1$-$304_4$ correspond to a first polarization and the feed lines $304_5$-$304_8$ correspond to a second polarization. Accordingly, the subassembly 114 may be operable to concurrently receive two different signals on the same frequency but having different polarizations, concurrently transmit two different signals on the same frequency but having different polarizations, and/or concurrently transmit a first signal having a first polarization and receive a second signal having a second polarization. Furthermore, the radiation pattern for the two polarizations may be controlled independently of one another. That is two independent sets of amplitude and phase beamforming coefficients may be maintained by circuitry 302 as, for example, described below with reference to FIGS. 5A-5B.

Figure 4A:
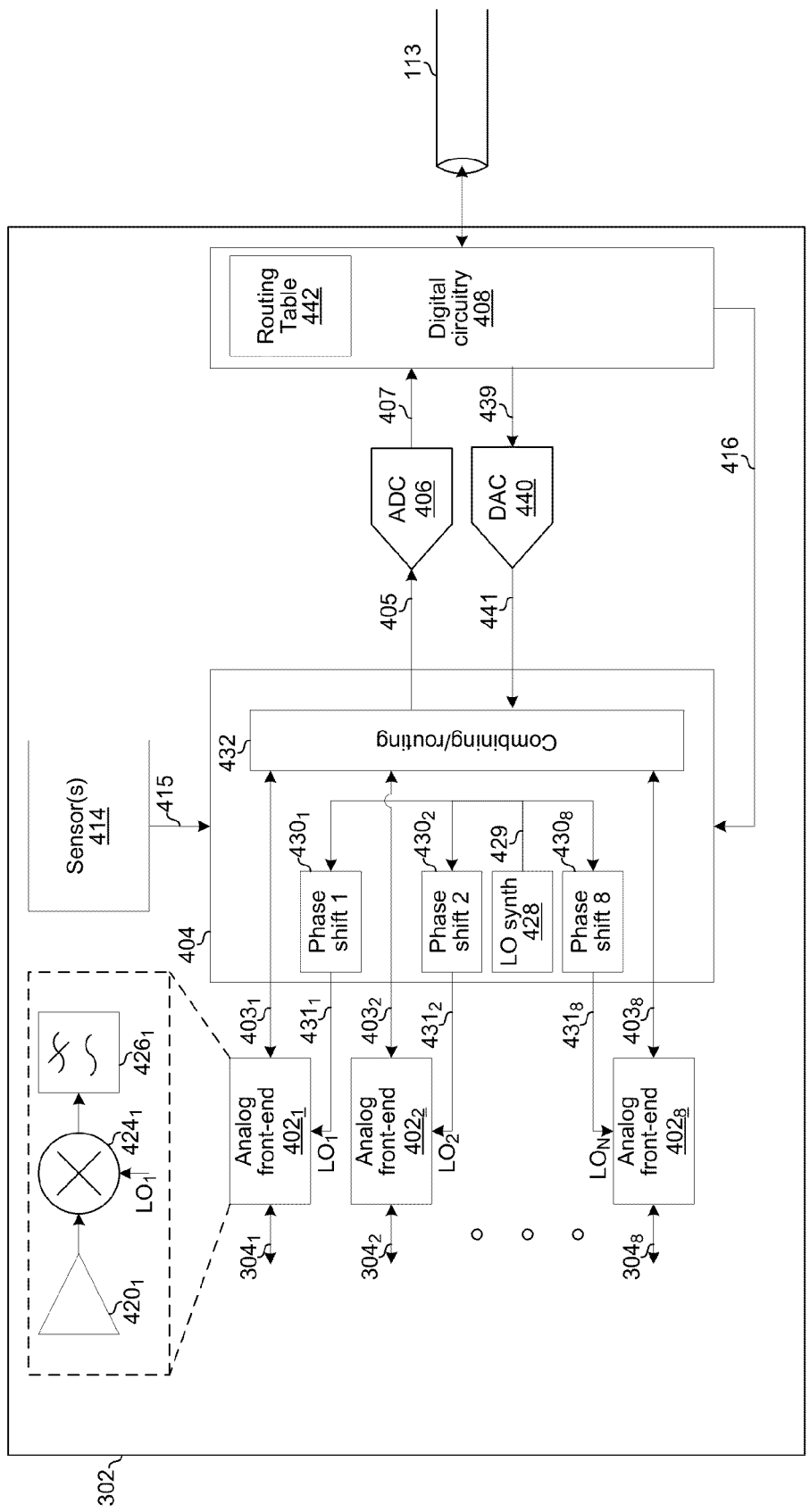
FIG. 4A shows a first example implementation of the circuitry of FIG. 3.

FIGS. 4A and 4C show a first example implementation of the circuitry of FIG. 3. In the example implementation shown, the circuitry 302 comprises analog front-ends $402_1$-$402_8$, a beamforming circuit 404, analog-to-digital converter (ADC) 406, one or more sensors 414, digital circuitry 408, and a digital-to-analog converter (DAC) 440. The circuitry 302 outputs received data onto link 113 (e.g., coaxial cable) and receives to-be-transmitted data via link 113.

The sensor(s) 414 may be operable to determine movement, orientation, geographic position, and/or other physical characteristics of the transceiver 120. Accordingly, the sensor(s) 414 may comprise, for example, a gyroscope, an accelerometer, a compass, a GPS receiver, and/or the like. Additionally or alternatively, the sensor(s) 414 may be operable to determine atmospheric conditions and/or other physical obstructions between the transceiver 120 and potential microwave backhaul link partners. Accordingly, the sensor(s) 414 may comprise, for example, a hygrometer, a psychrometer, and/or a radiometer. The sensor(s) 414 may output readings/measurements as signal 415.

For receive operations, each front-end circuit $402_n$ ($1 \leq n \leq N$, where N=8 in the example implementation depicted) is operable to receive a microwave signal via feed line $304_n$. The front-end circuit $402_n$ processes the signal on feed line $304_n$ by, for example, amplifying it via low noise amplifier LNA $420_n$, filtering it via filter $426_n$, and/or downconverting it via mixer $424_n$ to an intermediate frequency or to baseband. The local oscillator signal $431_n$ for the downconverting may be generated by the circuit 404, as described below. The result of the processing performed by each front-end circuit $402_n$ is a signal $403_n$.

The ADC 406 is operable to digitize signal 405 to generate signal 407. The bandwidth of the ADC 406 may be sufficient such that it can concurrently digitize entire microwave backhaul bands comprising a plurality of channels or sub-bands (e.g., the ADC 406 may have a bandwidth of 1 GHz or more).

The DAC 440 is operable to convert digital signal 439 (e.g., a digital baseband signal) to an analog signal 441.

For receive, the digital circuitry 408 is operable to process the digital signals 407 for output to link 113. The processing may include, for example, symbol-to-bits demapping, FEC decoding, deinterleaving, equalizing, and/or the like. The processing may include, for example, performing an interference (e.g., cross-polarization interference) cancellation process such as is described in, for example, the above-incorporated U.S. patent application publication Ser. No. 13/933,865. The processing may include, for example, channelization to select, for output to the link 113, sub-bands or channels of the signal 407. The processing may include, for example, band stacking, channel stacking, band translation, and/or channel translation to increase utilization of the available bandwidth on the link 113.

For transmit, the digital circuitry 408 is operable to perform digital baseband processing for preparing data received via link 113 to be transmitted via the microwave backhaul link(s) 118. Such processing may include, for example, processing of packets received via the link 113 to recover the payload data from such packets, and then packetization, modulation, etc. to generate a microwave backhaul digital baseband signal 439 carrying the payload data.

For transmit and receive, the digital circuitry 408 may determine which other microwave backhaul transceiver(s) to which to listen based on a routing table 442 that has entries for other microwave backhaul transceivers and which is maintained in accordance with one or more spatial routing algorithms. Thus, rather than having fixed communication partners and fixed communication parameters (bandwidth, modulation order, FEC code word length, and/or the like) designed to handle worst-case conditions, microwave backhaul transceivers in accordance with this disclosure may be operable to take advantage of the fact that most of the time worst-case conditions are not present and, therefore, parameters may be adjusted to increase range, increase throughput, decrease latency, decrease power consumption, and/or the like during non-worst-case conditions.

The beamforming circuit 404 comprises local oscillator synthesizer 428 operable to generate a reference local oscillator signal 429, and comprises phase shift circuits $430_1$-$430_N$ operable to generate N phase shifted versions of signal 429, which are output as signals $431_1$-$431_N$. The amount of phase shift introduced by each of the circuits $430_1$-$430_N$ may be determined by a corresponding one of a plurality phase coefficients. The plurality of phase coefficients may be controlled to achieve a desired radiation pattern of the antenna elements $306_1$-$306_4$. In another example implementation, additional front-end circuits 402 and phase shifters 430 may be present to enable concurrent reception of additional signals via the antenna elements $306_1$-$306_N$.

The beamforming circuit 404 also comprises a circuit 432 which is operable to perform weighting of the signals $403_1$-$403_8$ by their respective amplitude coefficients determined for the desired radiation pattern. For reception, the circuit 432 is operable to combine the weighted signals prior to outputting them on signal 405.

In an example implementation, the phase and/or amplitude coefficients may be controlled/provided by the digital circuitry 408 via signal 416. The phase and amplitude coefficients may be adjusted dynamically. That is, the coefficients may be adjusted while maintaining one or more active backhaul links.

Dynamically adjusting the phase and/or amplitude coefficients during reception of energy of microwave backhaul signals results in corresponding changes in the radiation pattern of the transceiver 120. Different patterns may capture different amounts of energy from different microwave backhaul signals. By adjusting the radiation pattern intelligently, sufficient energy from multiple beams may be captured during a single time interval such that content carried in each of the beams during that time interval can be demodulated and decoded with less than a threshold amount of errors. In other words, the "scanning" may effectively enable "illuminating" more of the reflector 116 than could a single antenna element having the same dimensions as the overall dimensions of the array of antenna elements 306. As an example to illustrate, for a first radiation pattern (i.e., first set of phase and amplitude coefficients), energy received from a first microwave backhaul signal may be above a threshold, but energy received from a second microwave backhaul signal may be below the threshold. Conversely, for a second radiation pattern, power received from the first microwave backhaul signal may be below the threshold, but power received from the second microwave backhaul signal may be above the threshold. Accordingly, by dwelling on each of the two radiation patterns for a sufficient percentage of a sufficiently short time interval, sufficient energy may be captured for each of the microwave backhaul signals during that time interval such that the information on both microwave backhaul signals during that time interval can be recovered.

In an example implementation, the sensor(s) 414 may indicate atmospheric conditions through which microwave backhaul signals to and/or from the transceiver 120 may travel. The digital circuitry 408 may make spatial routing decisions based on the atmospheric conditions. That is, the digital circuitry 408 may determine which other microwave backhaul transceiver to communicate with based on the atmospheric conditions and configure the phase and/or amplitude coefficients accordingly to achieve a radiation pattern that supports communication with the determined other microwave backhaul assembly. This may improve performance of the network in the presence of rain, snow, fog, smog, or other atmospheric conditions which negatively impact microwave communications.

In an example implementation, the sensor(s) 414 may indicate physical obstructions (which may include atmospheric conditions such as rain and/or other obstructions such as vehicles, animals, structures, etc.) which may impede microwave backhaul signals to and/or from the transceiver 120. The digital circuitry 408 may make spatial routing decisions based on the presence or absence of physical obstructions. That is, the digital circuitry 408 may determine which other microwave backhaul transceiver to communicate with based on the physical obstructions and configure the phase and/or amplitude coefficients accordingly to achieve a radiation pattern that supports communication with the determined other microwave backhaul assembly.

In an example implementation, the phase and/or amplitude beamforming coefficients may be controlled based on data retrieved from a local and/or networked database. Such data may include, for example, data indicating geographical locations of other microwave backhaul assemblies with which the transceiver 120 may desire to establish a microwave backhaul link, and/or data indicating atmospheric conditions which may impact microwave communications. Such data may, for example, be used for populating routing tables and/or spatial routing algorithms in the digital circuitry 408.

The implementation of circuitry 302 shown in FIG. 4A may be realized on any combination of one or more semiconductor (e.g., Silicon, GaAs) dies and/or one or more printed circuit board. For example, each front-end circuit $402_n$ may comprise one or more first semiconductor dies located as close as possible to (e.g., a few centimeters from) its respective antenna element $306_N$, the circuits 404 and 406 may comprise one or more second semiconductor dies on the same PCB as the first die(s), the circuits 408 and 440 may reside on one or more third semiconductor dies on the same PCB, and the sensor(s) 414 may be discrete components connected to the PCB via wires or wirelessly.

Figure 4B:
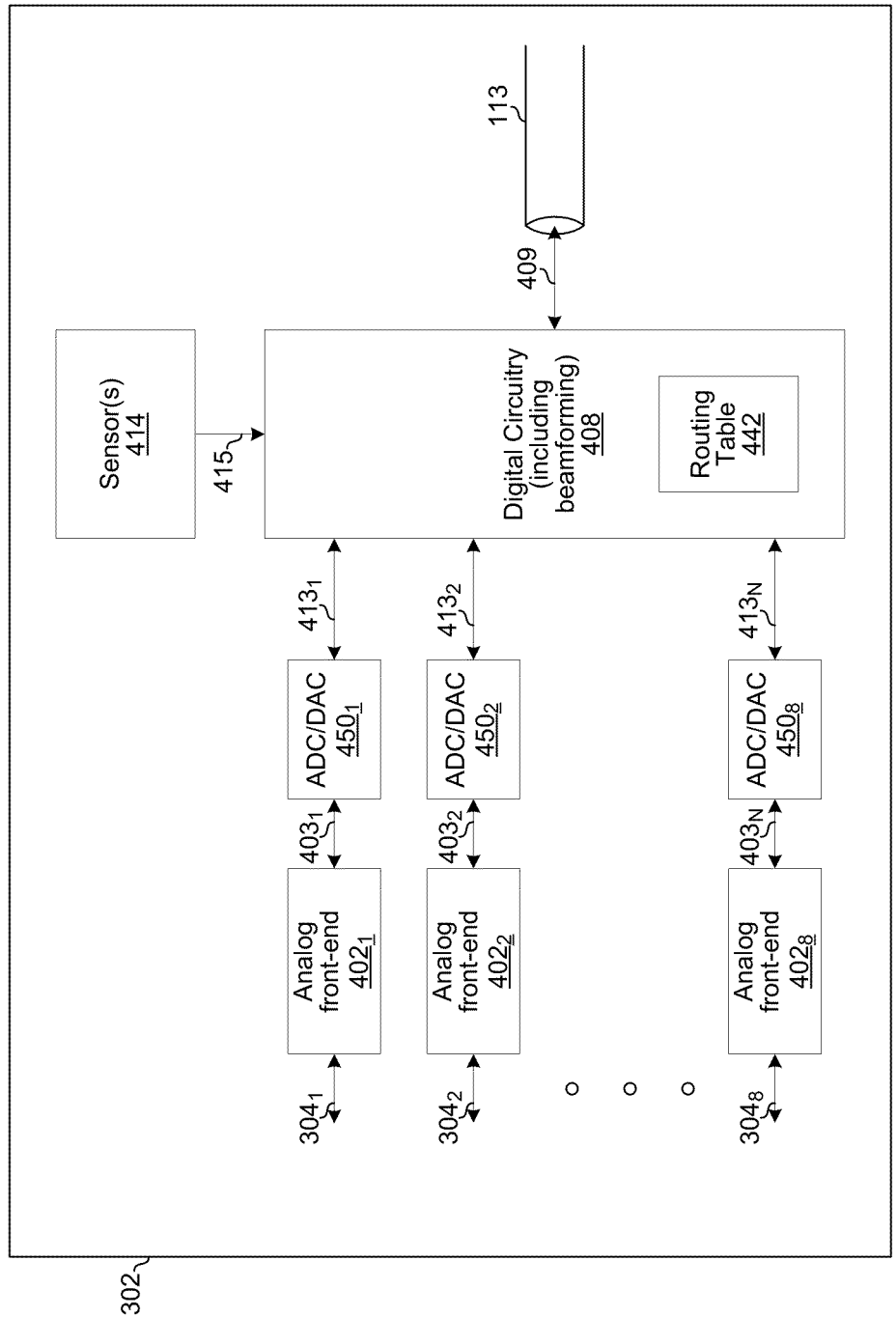
FIG. 4B shows a second example implementation of the circuitry of FIG. 3.

FIG. 4B depicts a second example implementation of the circuitry 302. In this example implementation, the application of beamforming amplitude and phase coefficients is performed in the digital domain in digital circuitry 408. That is, in addition to other functions performed by digital circuitry 408 (such as those described above), the digital circuitry may also perform phase and amplitude weighting and combining of the signals $413_1$-$413_8$.

Each of the circuits $450_1$-$450_8$ is operable to perform digital-to-analog conversion (when used for transmission) and/or analog-to-digital conversion (when used for reception). In this regard, for reception, the signals $413_1$-$413_8$ are the result of digitization of the signals $403_1$-$403_8$ output by the front-ends $402_1$-$402_8$. For transmission, the signals $413_1$-$413_8$ are the result of digital circuitry 408 performing phase and amplitude weighting and combining of one or more digital baseband signals (the weighting and combining may be as described in FIG. 5B, for example).

The implementation of circuitry 302 shown in FIG. 4B may be realized on any combination of one or more semiconductor (e.g., Silicon, GaAs) dies and/or one or more printed circuit board. For example, each pair of $402_n$ and $450_n$ may comprise an instance of a first semiconductor die and may be located as close as possible to (e.g., a few centimeters from) its respect antenna element $306_n$, the digital circuitry 408 may comprise an instance of a second semiconductor die on the same PCB as the first dies, and the sensor(s) 414 may be discrete components connected to the PCB via wires or wirelessly.

Figure 5A:
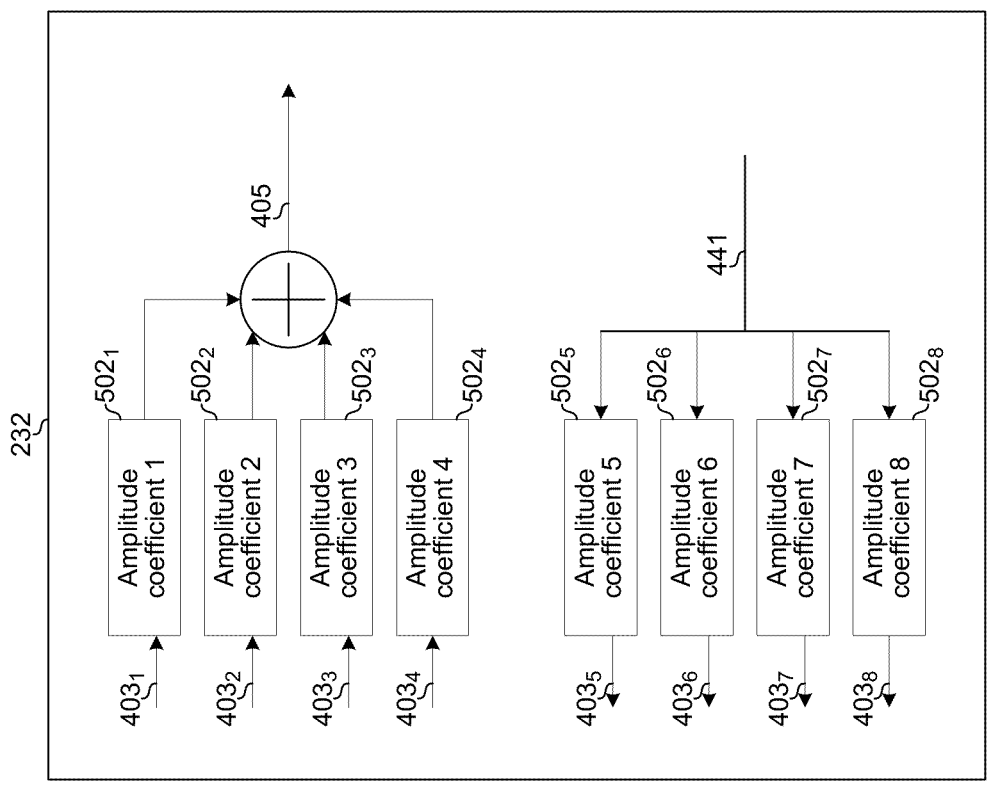
FIG. 5A shows an example configuration of the beamforming circuitry of FIG. 4A.

Referring now to FIG. 5A, there is shown an example implementation of the circuit 232 that supports spatial routing of a full-duplex microwave backhaul link. In the example implementation shown, the signals $403_1$-$403_4$ correspond to a received signal having a first polarization (e.g., horizontal) and the signals $403_5$-$403_8$ correspond to a signal to be transmitted with a second polarization (e.g., vertical).

In the receive direction, each of the signals $403_1$-$403_4$ has been received via a respective one of antenna elements $306_1$-$306_4$, and had its phase shifted, during downconversion by a respective one of mixers $402_1$-$402_4$, by a respective phase coefficient of a selected first set of coefficients. In circuit 232, the amplitude of each of signals $403_1$-$403_4$ is scaled by a respective amplitude coefficient of the selected first set of coefficients. The weighted signals are summed resulting in signal 405. The signal 405 thus corresponds to a received signal using a radiation pattern corresponding to the selected first set of phase and amplitude coefficients.

In the transmit direction, the signal 441 is split into four signals, each of which has its amplitude scaled by a respective amplitude coefficient of a selected second set of coefficients. The result of the amplitude scaling is signals $403_5$-$403_8$. The signals $403_5$-$403_8$ are conveyed to front-ends $402_5$-$402_8$ where, during upconversion to microwave frequency, each is phase shifted by a respective phase coefficient of the selected second set of coefficients. The upconverted signals are then conveyed, via feed lines $304_5$-$304_8$, to antenna elements $306_1$-$306_4$ for transmission.

For both transmitting and receiving with the same link partner on the same frequency, the first set of phase and amplitude coefficients is the same as the second set of phase and amplitude coefficients. This may be achieved by storing a single set of coefficients and providing the same set to both scaling circuits $502_1$-$502_4$ and $502_5$-$502_8$.

For transmitting to a first link partner while receiving from a second link partner on the same frequency, the first set of phase and amplitude coefficients is the different than the second set of phase and amplitude coefficients. This may be achieved by storing two sets of coefficients and providing the first set to circuits $502_1$-$502_4$ and the second set to circuits $502_5$-$502_8$. This enables independently adjusting the two sets of coefficients which corresponds to independently steering the transmit and receive radiation patterns.

Figure 5B:
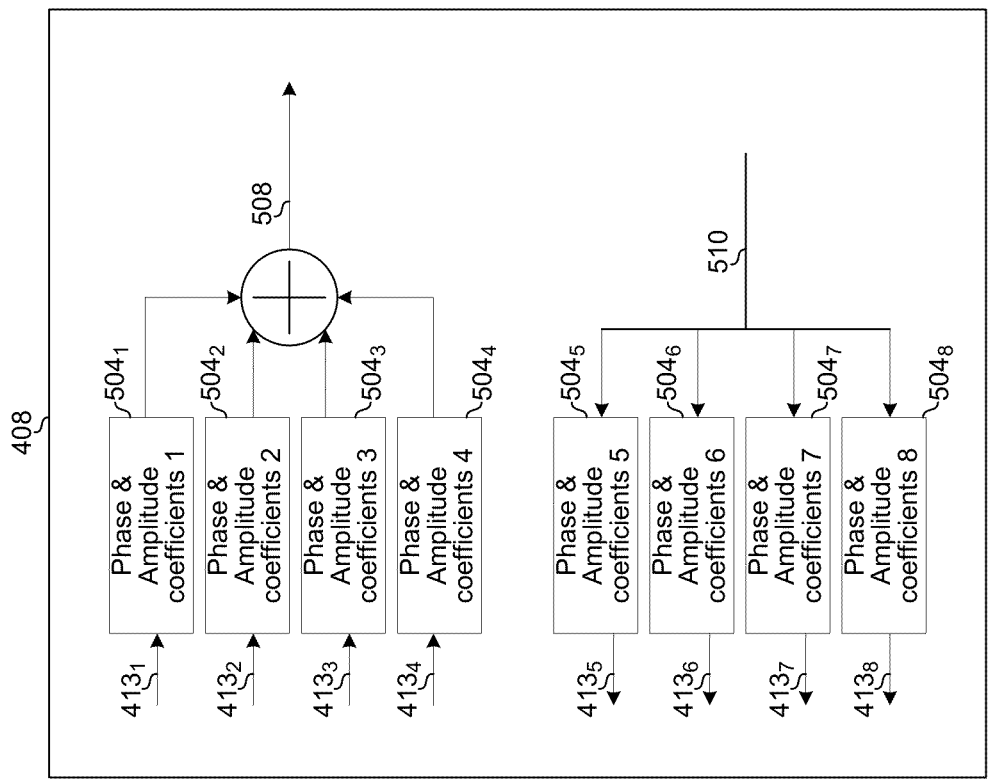
FIG. 5B shows an example configuration of beamforming components of the digital signal processing circuitry of FIG. 4B.

Referring now to FIG. 5B, there is shown an example implementation digital circuitry that supports spatial routing of a full-duplex microwave backhaul link. In the example implementation shown, the signals $413_1$-$413_4$ correspond to a received signal having a first polarization (e.g., horizontal) and the signals $413_5$-$413_8$ correspond to a signal to be transmitted with a second polarization (e.g., vertical).

In the receive direction, each of the signals $413_1$-$413_4$ has been received via a respective one of antenna elements $306_1$-$306_4$, downconverted by a respective one of mixers $402_1$-$402_4$, and digitized by a respective one of circuits $450_1$-$4504$. The circuits $504_1$-$504_4$ scale the amplitudes of the signals $403_1$-$403_4$ by respective amplitude coefficients of a selected first set of coefficients. The circuits $504_1$-$504_4$ also phase shift the signals $403_1$-$403_4$ by respective phase coefficients of the selected first set of coefficients. The resulting phase-shifted and amplitude-scaled signals are then combined to generate signal 508. The signal 508 thus corresponds to a received signal using a radiation pattern corresponding to the selected first set of phase and amplitude coefficients.

In the transmit direction, the signal 510 is split into four signals. Each of the circuits $504_5$-$504_8$ scales a respective one of the signals $413_5$-$413_8$ by a respective amplitude coefficient of a selected second set of coefficients. Each of the circuits $504_5$-$504_8$ shifts a phase of a respective one of the signals $413_5$-$413_8$ by a respective phase coefficient of the selected second set of coefficients. The result of the amplitude scaling is signals $403_5$-$403_8$. The signals $403_5$-$403_8$ are conveyed to circuits $450_5$-$450_8$ where they are converted to analog signals $403_5$-$403_8$. The signals $403_5$-$403_8$ are then upconverted by front-ends $402_5$-$402_8$ and then conveyed, via feed lines $304_5$-$304_8$, to antenna elements $306_1$-$306_4$ for transmission.

For both transmitting and receiving with the same link partner on the same frequency, the first set of phase and amplitude coefficients may be the same as the second set of phase and amplitude coefficients. This may be achieved by storing a single set of coefficients and providing the same set to both scaling circuits $504_1$-$504_4$ and $504_5$-$504_8$.

For transmitting to a first link partner while receiving from a second link partner on the same frequency, the first set of phase and amplitude coefficients may be different than the second set of phase and amplitude coefficients. This may be achieved by storing two sets of coefficients and providing the first set to circuits $504_1$-$504_4$ and the second set to circuits $504_5$-$504_8$. This enables independently adjusting the two sets of coefficients which corresponds to independently steering the transmit and receive radiation patterns.

Although the example implementations in FIGS. 5A and 5B use different polarizations to enable concurrent transmission and reception on the same frequencies, other implementations may use different frequencies for transmit and receive (where the antenna elements $306_1$-$306_4$ are sufficiently broadband to cover the different frequencies). In such implementations, different sets of coefficients for transmit and receive may be used to achieve transmit and receive radiation patterns having substantially similar directivity.

Figure 6A:
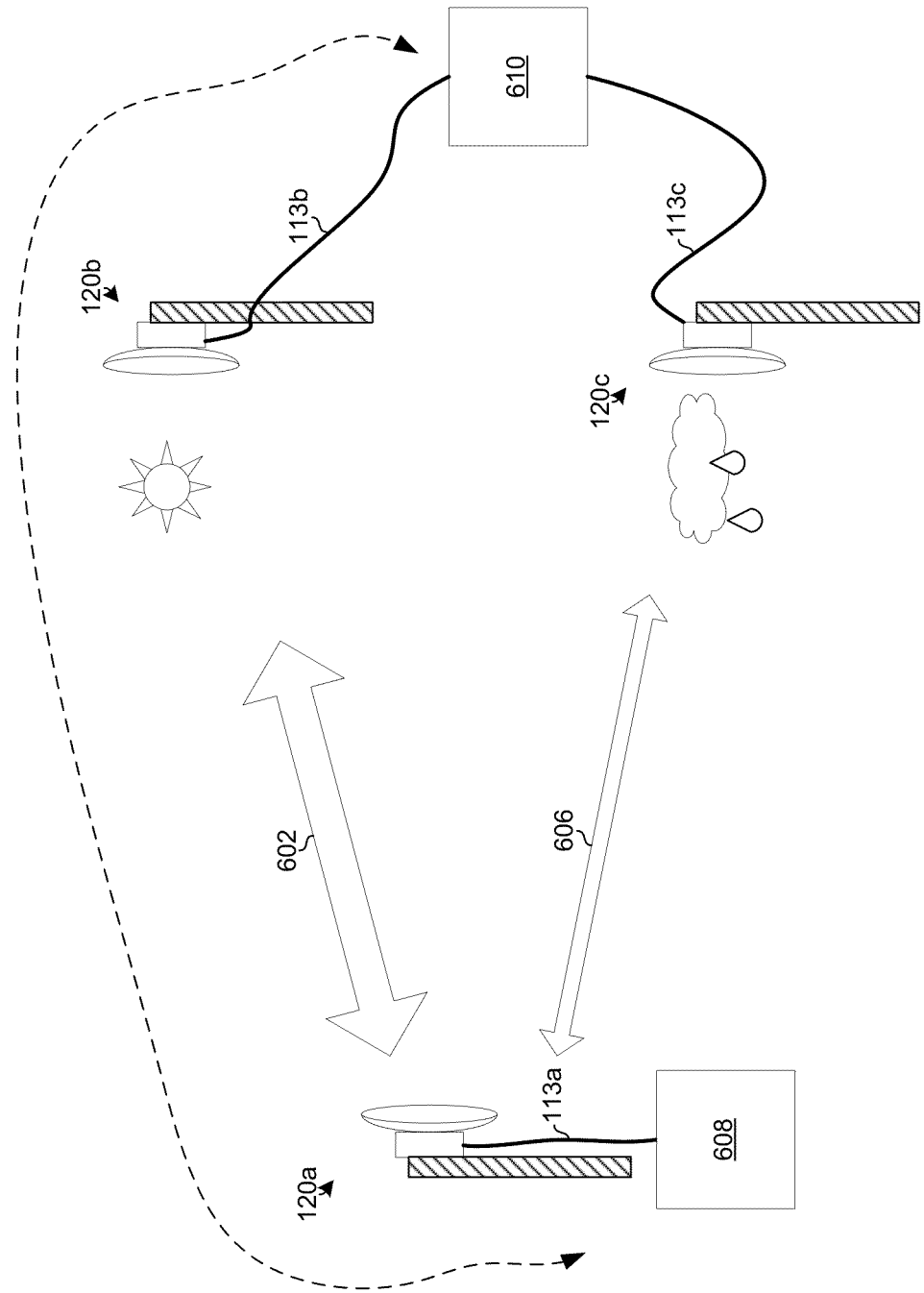
FIGS. 6A-6B illustrate spatial routing for maximizing throughput.
Figure 6B:
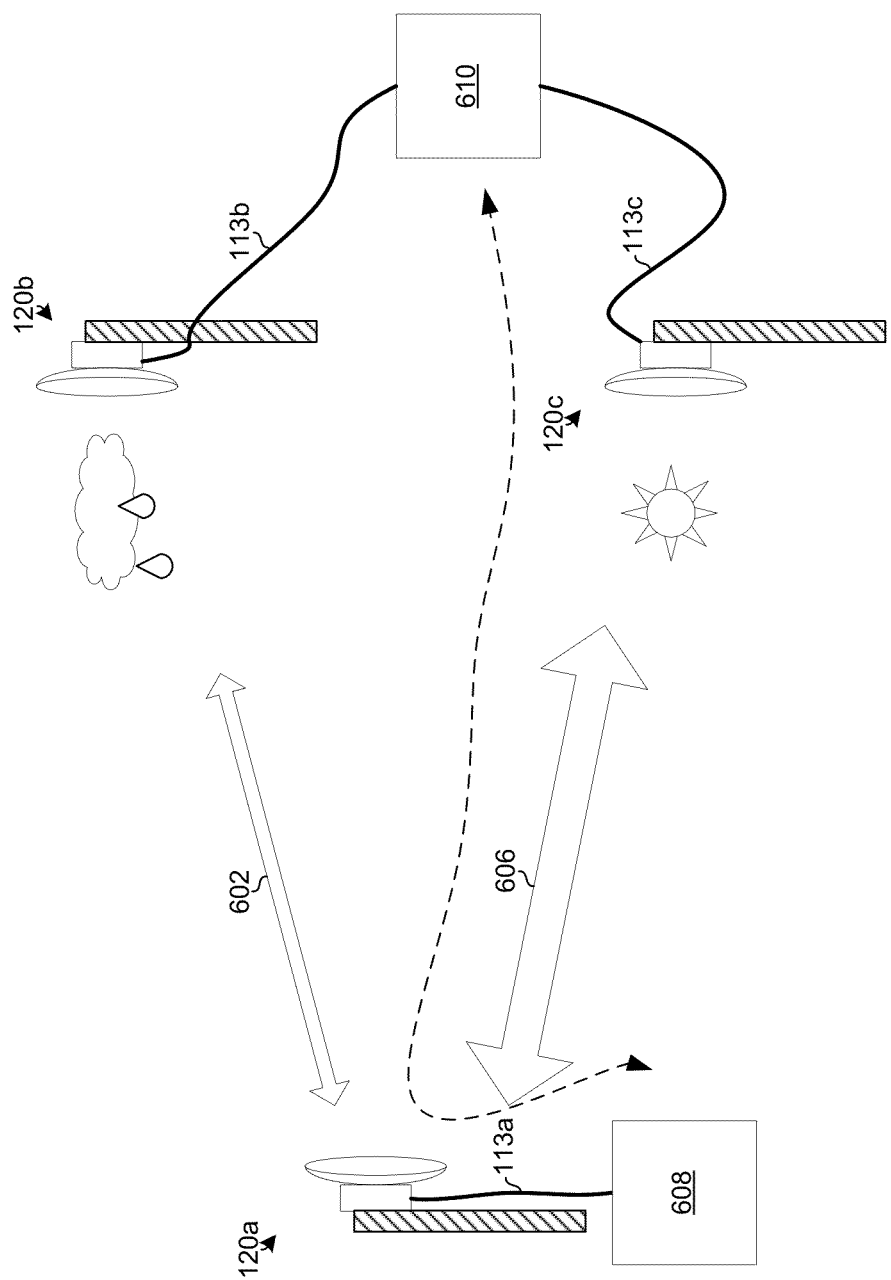
Figure 7A:
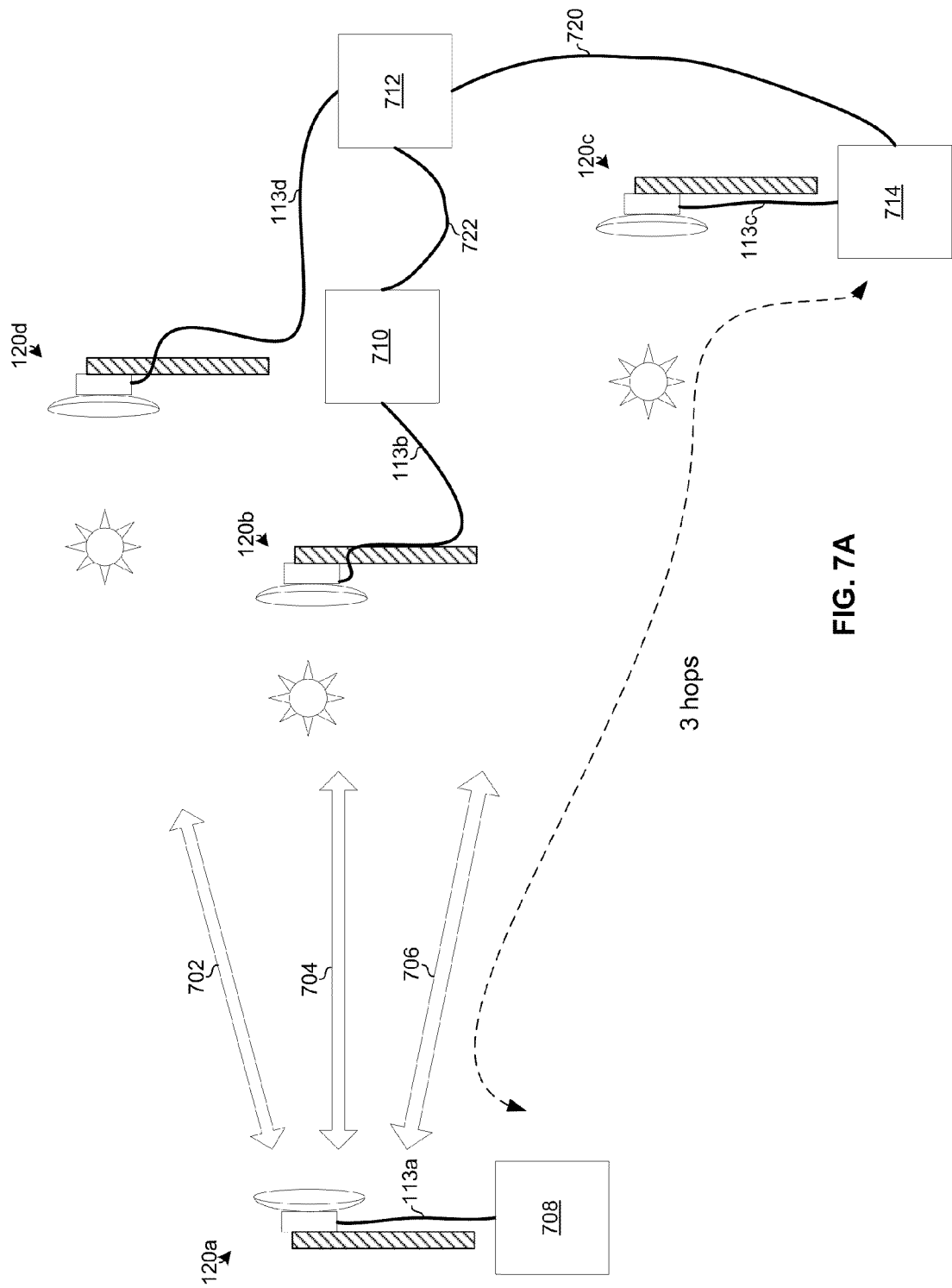
FIGS. 7A-7C illustrate spatial routing for minimizing latency.
Figure 7B:
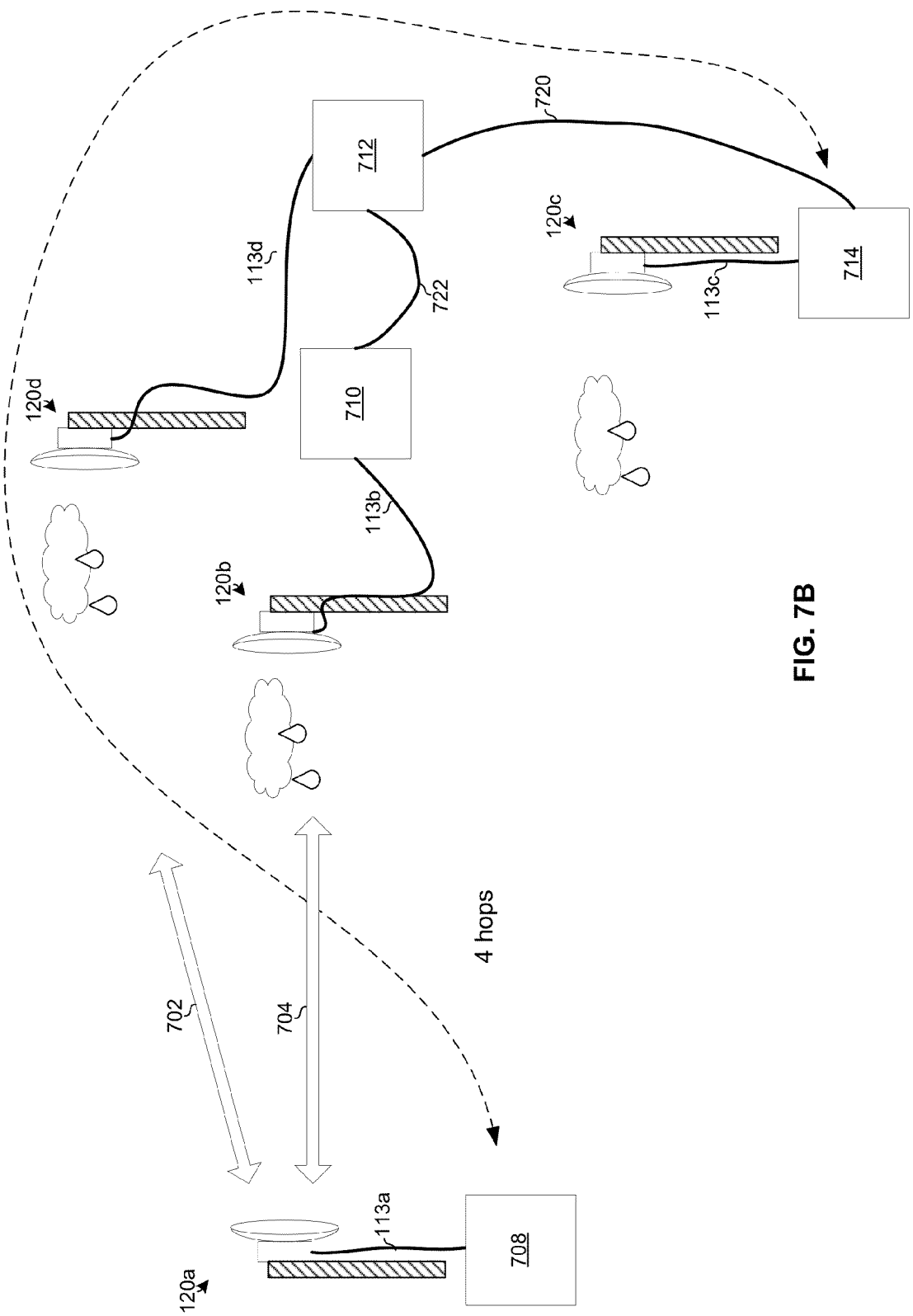
Figure 7C:
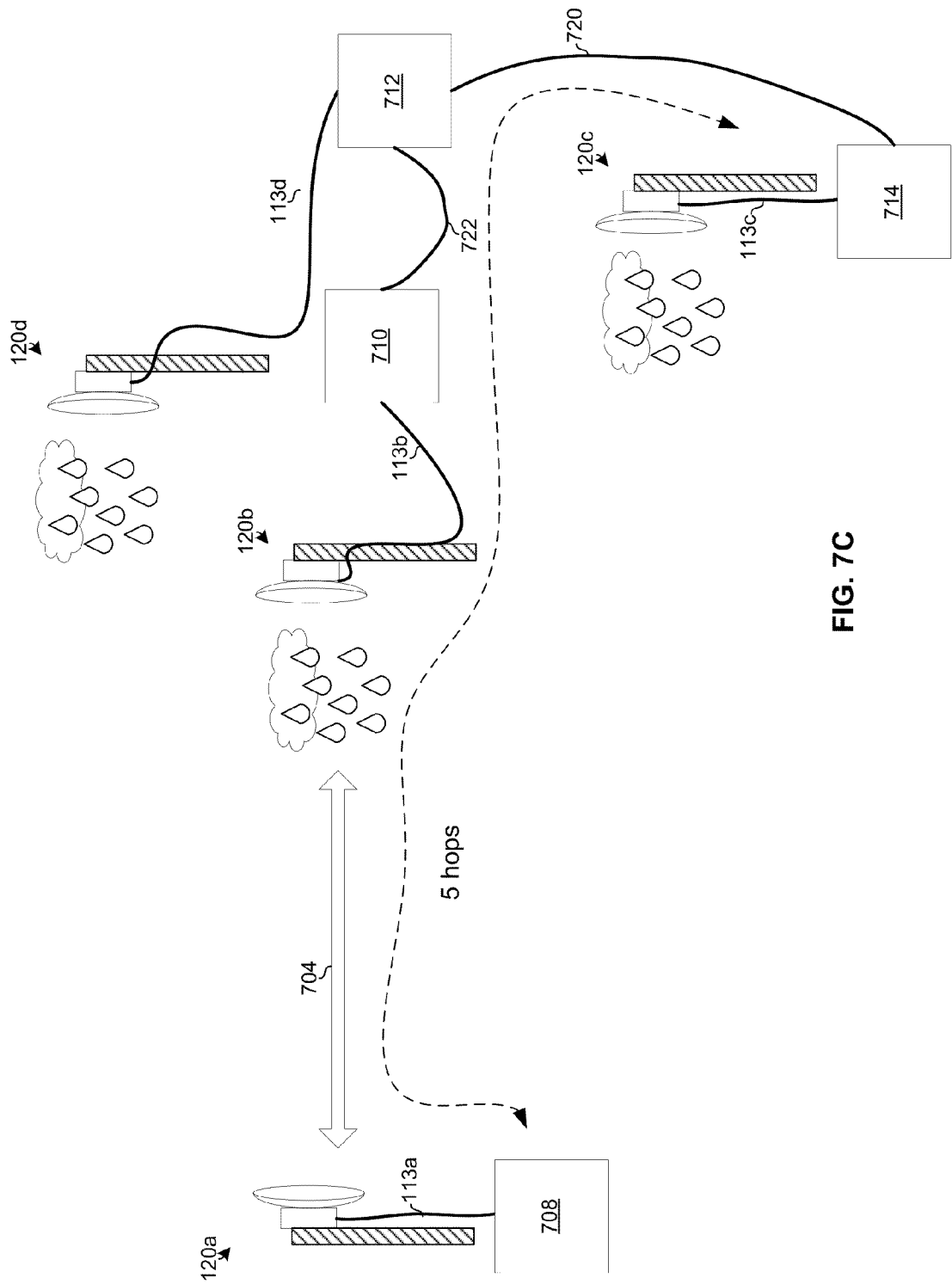

The use of a focal-plane array and associated circuitry may in a microwave backhaul transceiver 120 enable a first microwave backhaul transceiver 120 to select one or more link partner(s) from a set of second microwave backhaul transceivers. For example, the microwave backhaul transceiver 120a of FIGS. 6A and 6B is operable to select between communicating with microwave backhaul transceiver 120b via link 602, communicating with microwave backhaul transceiver 120c via link 606, or communicating with both 120b and 120c via links 602 and 606. In this regard, a first set of beamforming coefficients may achieve a radiation pattern primarily directed at 120b and a second set of beamforming coefficients may achieve a radiation pattern primarily directed at 120c. Factors which spatial routing algorithms implemented in the transceiver 120a may take into account when deciding which of the links to transmit on and/or listen to include: atmospheric conditions, physical obstructions in the line-of-sight, performance metrics (e.g., throughput, signal-to-noise ratio (SNR), packet error rate, symbol error rate, bit error rate, latency, energy efficiency (e.g., bits per joule), destination of the data, and/or the like) of the links 602 and 606, and/or use of frequencies and airspace by other microwave backhaul transceivers. While any combination of these and other factors may be used by the spatial routing algorithms, FIGS. 6A and 6B provide one example in which spatial routing is performed based on atmospheric conditions and throughput, and FIGS. 7A-7C provide another example in which spatial routing is performed based on backhaul link performance and latency.

For spatial routing based on destination of the data to be backhauled, the beamforming parameters may change along with the destination address of data to be transmitted. For example, where the data is packetized with each packet containing a destination address, the parameters may be determined on a packet-by-packet basis. Similarly, where bursts of packets are backhauled, the parameters may be determined on a burst-by-burst basis.

In FIGS. 6A and 6B, it is assumed for purposes of illustration (and not limitation) that the transceivers 120b and 120c are equidistant from transceiver 120a and that line-of-sight between 120a and 120b is at the same angle (relative to boresight of transceiver 120a) as the line-of-sight between 120a and 120c. It is further assumed for illustration, that differences in throughput between links 602 and 606 are due entirely to atmospheric attenuation (i.e., they use all the same protocols, signaling parameters, etc.).

Given the assumptions of the preceding paragraph, in FIG. 6A, where skies are clear between transceiver 120a and 120b but there is rain between transceivers 120a and 120c, higher throughput is achievable on link 602 than link 606. This results in the link 602 being selected for backhauling data between nodes 608 and 610. Accordingly, the transceiver 120a configures its radiation pattern for communication with transceiver 120b. In FIG. 6B on the other hand, where the atmospheric conditions on the links are now reversed (e.g., as an isolated thunderstorm has swept across the area) the link 606 offers higher throughput. As a result, link 606 is selected for backhauling data between nodes 608 and 610, and the radiation pattern of the transceiver 120a is configured accordingly.

In an example implementation, whichever of links 602 and 606 is not being used for backhauling data may still be kept active. For example, while backhauling data over link 602, the transceiver 120a may periodically switch back to the link 606 just long enough to send and/or receive pilots or other information for maintaining synchronization between 120a and 120c. This may speed up the transition from backhauling over link 602 to backhauling over link 606, thus introducing less latency in the data and requiring less memory for buffering. This may enable the spatial routing performed by the transceiver 120a to be transparent to the nodes 608 and 610 (i.e., it makes no difference to the nodes 608 and 610 whether data was received via 602 or 606).

In FIGS. 7A-7C there are shown four microwave backhaul transceivers 120a-120d. For purposes of illustration (and not limitation) it is assumed that transceiver 120b is 1 km from transceiver 120a at an angle of 0°, transceiver 120c is 1.5 km from transceiver 120a at an angle of +3°, and transceiver 120d is 1.2 km from transceiver 120a at an angle of −3°. For purposes of illustration, it is also assumed that each wired hop in FIG. 7A-7C has the same latency and that the differences in propagation time between the three backhaul links 702, 704, and 706 is negligible.

In the clear weather conditions of FIG. 7A, the transceiver 120a is capable of communicating with transceiver 120c at some minimum necessary SNR. In FIG. 7A link 706 is selected for backhauling data from node 708 to node 714 as the total path consists of only three hops. Accordingly, the radiation pattern of transceiver 120a is configured for backhauling the data to transceiver 120c.

In the deteriorated atmospheric conditions of FIG. 7B, however, the minimum necessary SNR is no longer achievable on link 706 (706 being the longest of the three backhaul links). Consequently, the transceiver 120a needs to select a different path. Since both links 702 and 704 can still achieve the minimum SNR, transceiver 120a is configured for backhauling the data over link 702 since it consists of four hops as opposed to five hops for going over backhaul link 704.

In FIG. 7C, the atmospheric conditions have deteriorated again to the point where the minimum necessary SNR can no longer be achieved on link 702. Accordingly, the transceiver selects link 704 and configures its radiation pattern accordingly.

The routing may also include fiber links, cellular links, Wi-Fi links, and/or other channels available at one or more of the microwave/millimeter-wave radio assemblies. For example, where none of the links 702, 704, and 706 can achieve the necessary minimum SNR, the transceiver 120a may backhaul the data over a cellular connection (not shown) that operates on frequencies relatively immune to atmospheric attenuation and/or or over a fiber connection (not shown). Using such alternative connections for backhauling may be used only as a last resort because of cost, for example (e.g., the owner of the backhaul transceiver 120a has to pay the cellular provider or fiber provider).

Figure 8:
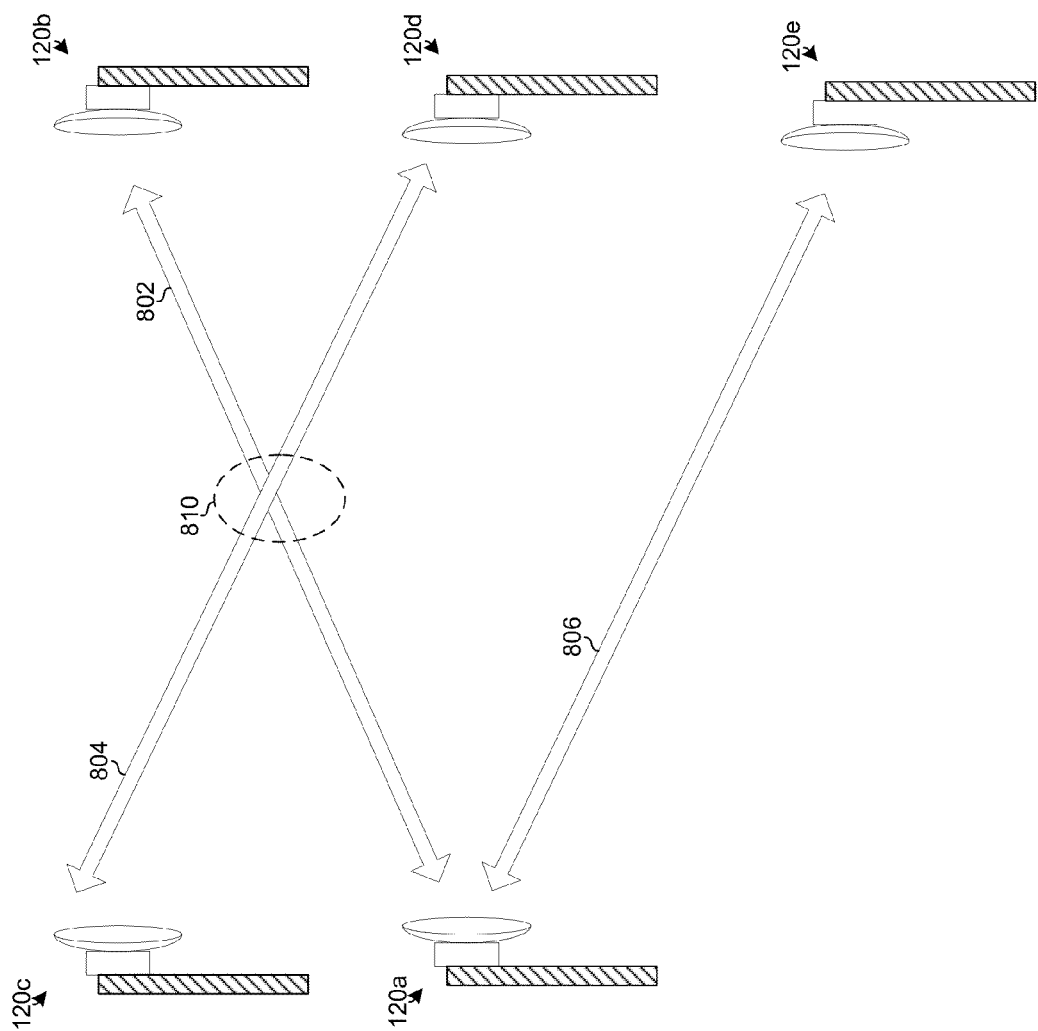
FIG. 8 illustrates spatial routing for avoiding collisions among backhaul links.

In an example implementation, spatial routing by a microwave backhaul transceiver may be based on use of airspace and/or avoiding collisions with other backhaul links. For example, referring to FIG. 8, the links 802 between transceivers 120a and 120b may use the same frequencies and intersect at line-of-sight intersection 810. The line-of-sight intersection 810 may, for example be determined from GPS coordinates and mounting heights of the transceivers 120a-120d. For example, when deciding whether to backhaul data via link 802 or link 806, the transceiver 120a may determine whether there is likely to be data on link 804 at the same time. This may be determined, for example, from a centralized service that schedules and/or monitors activity on the backhaul link 810. Where, for example, link 802 is otherwise preferable, the transceiver 120a may generally backhaul data over link 802 except when transmissions are occurring on link 810, in which case it may backhaul data over link 806.

In an example implementation, the service may broker access to the frequencies which are used on links having line-of-sight intersections. If the service indicates that the intersection is available at a particular time, a license for using the frequencies in the intersection at that particular time may be taken out for the amount of time needed (licenses may be available in second, minute, hour, or day increments, for example). Where two transceivers are vying for the same frequency at a particular location and particular time, bidding or some other form of arbitration may be used to decide which transceiver gets the license.

In accordance with an example implementation of this disclosure, a first microwave backhaul transceiver (e.g., 120a of FIG. 6A) may comprise a plurality of antenna elements (e.g., $306_1$-$306_4$). The transceiver may determine atmospheric conditions between it and one or more potential link partners, and adjust a radiation pattern of the plurality of antenna elements based on the determined atmospheric conditions. A first radiation pattern of the plurality of antenna elements may correspond to a first microwave backhaul link between the first microwave transceiver and the second microwave backhaul transceiver. A second radiation pattern of the plurality of antenna elements may correspond to a second microwave backhaul link between the first microwave transceiver and the third microwave backhaul transceiver. The transceiver may adjust the radiation pattern while maintaining one or more active microwave backhaul links. The transceiver may adjust the radiation pattern based on characteristics of data to be transmitted. The characteristics may comprise a destination address of the data to be transmitted. For backhauling packets of data, the transceiver may adjust the radiation pattern on a packet-by-packet basis. The transceiver may store and update (e.g., continuously or periodically) a routing table having entries associated with the second microwave backhaul transceiver and the third microwave backhaul transceiver. The transceiver may adjust the radiation pattern based on the routing table. The transceiver may adjust the radiation pattern to be the first radiation pattern when atmospheric attenuation between the first microwave backhaul transceiver and the second microwave backhaul transceiver (e.g., 120b of FIGS. 6A and 6B) is less than atmospheric attenuation between the first microwave backhaul transceiver and the third microwave backhaul transceiver (e.g., 120c of FIGS. 6A and 6B). The transceiver may adjust the radiation pattern to be the second radiation pattern when the determined atmospheric conditions are such that atmospheric attenuation between the first microwave backhaul transceiver and the second microwave backhaul transceiver is greater than atmospheric attenuation between the first microwave backhaul transceiver and the third microwave backhaul transceiver. The transceiver may determine activity on a third backhaul link which intersects with the first microwave backhaul link, and adjust the radiation pattern based on the determined activity on the link so as to avoid collisions between the first microwave backhaul link and the third microwave backhaul link. The determining of the activity on the third backhaul link may be accomplished by accessing a network service that maintains backhaul link activity information.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
    circuitry of a first microwave backhaul transceiver comprising a plurality of antenna elements, wherein:
        said circuitry is operable to determine atmospheric conditions in the communication area of said first microwave backhaul transceiver;
        said circuitry is operable to adjust a radiation pattern of said plurality of antenna elements based on said determined atmospheric conditions;
        a first radiation pattern of said plurality of antenna elements corresponds to a first microwave backhaul link between said first microwave backhaul transceiver and a second microwave backhaul transceiver; and
        a second radiation pattern of said plurality of antenna elements corresponds to a second microwave backhaul link between said first microwave backhaul transceiver and a third microwave backhaul transceiver.

2. The system of claim 1, wherein said circuitry is operable to perform said adjustment of said radiation pattern while maintaining one or more active microwave backhaul links.

3. The system of claim 1, wherein said circuitry is operable to adjust said radiation pattern based on characteristics of data to be transmitted by said first microwave backhaul transceiver.

4. The system of claim 3, wherein said characteristics comprise a destination address of said data to be transmitted by said first microwave backhaul transceiver.

5. The system of claim 1, wherein, for backhauling packets of data, said circuitry is operable to adjust said radiation pattern on a packet-by-packet basis.

6. The system of claim 1, wherein said circuitry comprises memory that stores a routing table having entries associated with said second microwave backhaul transceiver and said third microwave backhaul transceiver.

7. The system of claim 6, wherein said circuitry is operable to adjust said radiation pattern based on said routing table.

8. The system of claim 1, wherein:
    said circuitry is operable to adjust said radiation pattern to be said first radiation pattern when said determined atmospheric conditions are such that atmospheric attenuation between said first microwave backhaul transceiver and said second microwave backhaul transceiver is less than atmospheric attenuation between said first microwave backhaul transceiver and said third microwave backhaul transceiver; and
    said circuitry is operable to adjust said radiation pattern to be said second radiation pattern when said determined atmospheric conditions are such that atmospheric attenuation between said first microwave backhaul transceiver and said second microwave backhaul transceiver is greater than atmospheric attenuation between said first microwave backhaul transceiver and said third microwave backhaul transceiver.

9. The system of claim 1, wherein:
    said circuitry is operable to determine activity on a third microwave backhaul link which intersects with said first microwave backhaul link; and
    said circuitry is operable to adjust said radiation pattern based on said determined activity on said link so as to avoid collisions between said first microwave backhaul link and said third microwave backhaul link.

10. The system of claim 9, wherein said circuitry is operable to determine said activity on said third microwave backhaul link by accessing a network service which maintains backhaul link activity information.

11. A method comprising:
    in a first microwave backhaul transceiver comprising a plurality of antenna elements:

determining atmospheric conditions in the communication area of said first microwave backhaul transceiver; and adjusting a radiation pattern of said plurality of antenna elements based on said determined atmospheric conditions;

wherein a first radiation pattern of said plurality of antenna elements corresponds to a first microwave backhaul link between said first microwave backhaul transceiver and a second microwave backhaul transceiver; and wherein a second radiation pattern of said plurality of antenna elements corresponds to a second microwave backhaul link between said first microwave backhaul transceiver and a third microwave backhaul transceiver.

12. The method of claim 11, comprising performing said adjusting of said radiation pattern while maintaining one or more active microwave backhaul links.

13. The method of claim 11, comprising adjusting said radiation pattern based on characteristics of data to be transmitted by said first microwave backhaul transceiver.

14. The method of claim 13, wherein said characteristics comprise a destination address of said data to be transmitted by said first microwave backhaul transceiver.

15. The method of claim 11, comprising, for backhauling packets of data, adjusting said radiation pattern on a packet-by-packet basis.

16. The method of claim 11, comprising storing and updating a routing table having entries associated with said second microwave backhaul transceiver and said third microwave backhaul transceiver.

17. The method of claim 16, comprising adjusting said radiation pattern based on said routing table.

18. The method of claim 11, comprising:

adjusting said radiation pattern to be said first radiation pattern when said determined atmospheric conditions are such that atmospheric attenuation between said first microwave backhaul transceiver and said second microwave backhaul transceiver is less than atmospheric attenuation between said first microwave backhaul transceiver and said third microwave backhaul transceiver; and adjusting said radiation pattern to be said second radiation pattern when said determined atmospheric conditions are such that atmospheric attenuation between said first microwave backhaul transceiver and said second microwave backhaul transceiver is greater than atmospheric attenuation between said first microwave backhaul transceiver and said third microwave backhaul transceiver.

19. The method of claim 11, wherein:

comprising determining activity on a third microwave backhaul link which intersects with said first microwave backhaul link; and adjusting said radiation pattern based on said determined activity on said link so as to avoid collisions between said first microwave backhaul link and said third microwave backhaul link.

20. The method of claim 19, comprising determining said activity on said third microwave backhaul link by accessing a network service which maintains backhaul link activity information.

* * * * *